US010348366B2

(12) United States Patent
Croft

(10) Patent No.: US 10,348,366 B2
(45) Date of Patent: Jul. 9, 2019

(54) DATA COLLECTION NETWORK AND DATA COLLECTION DEVICE

(71) Applicant: ENCOUNTER SOLUTIONS LIMITED, Auckland (NZ)

(72) Inventor: Simon Francis Croft, Auckland (NZ)

(73) Assignee: ENCOUNTER SOLUTIONS LIMITED, Aukland (NZ)

( * ) Notice: Subject to any disclaimer, the term of this patent is extended or adjusted under 35 U.S.C. 154(b) by 0 days.

(21) Appl. No.: 15/739,465

(22) PCT Filed: Jun. 30, 2016

(86) PCT No.: PCT/NZ2016/050106
§ 371 (c)(1),
(2) Date: Dec. 22, 2017

(87) PCT Pub. No.: WO2017/003302
PCT Pub. Date: Jan. 5, 2017

(65) Prior Publication Data
US 2018/0175911 A1    Jun. 21, 2018

(30) Foreign Application Priority Data
Jun. 30, 2015  (NZ) ........................................ 709581

(51) Int. Cl.
*H04W 4/80*  (2018.01)
*H04B 5/00*  (2006.01)
*H04B 1/38*  (2015.01)

(52) U.S. Cl.
CPC ............ *H04B 5/0031* (2013.01); *H04W 4/80* (2018.02); *H04B 1/38* (2013.01); *H04B 2001/3894* (2013.01)

(58) Field of Classification Search
CPC .............................. H04B 5/0031; H04B 1/38; H04B 2001/3894; H04W 4/80; G06F 3/165
USPC ............................................ 455/41.1; 700/94
See application file for complete search history.

(56) References Cited

U.S. PATENT DOCUMENTS

| 3,679,960 | A | * | 7/1972 | Hirokawa | G01C 19/10 310/74 |
| 6,014,089 | A | * | 1/2000 | Tracy | G01D 4/006 340/870.02 |
| 6,150,955 | A | * | 11/2000 | Tracy | G01D 4/006 340/870.02 |
| 6,318,870 | B1 | * | 11/2001 | Spooner | B60R 1/086 248/477 |
| 6,369,719 | B1 | * | 4/2002 | Tracy | G01D 4/006 250/231.14 |
| 6,629,389 | B1 | * | 10/2003 | Rust | G09F 7/18 248/551 |

(Continued)

OTHER PUBLICATIONS

H. Bakht, "History of mobile ad hoc networks," pub. By. Liverpool John Moores University, United Kingdom, 16 pages.
(Continued)

*Primary Examiner* — Hai V Nguyen
(74) *Attorney, Agent, or Firm* — Hickman Palermo; Becker Bingham LLP

(57) ABSTRACT

A networking device is described the device comprising a processor, memory, at least one network device, and a plurality of capacitive and/or inductive based circuits, the circuits being usable for coupling aerials and accessories to the networking 5 device and capable of being used for user input.

19 Claims, 3 Drawing Sheets

(56) References Cited

U.S. PATENT DOCUMENTS

| | | | | |
|---|---|---|---|---|
| 6,631,647 B2* | 10/2003 | Seale | G01N 3/00 | 73/760 |
| 6,690,265 B2* | 2/2004 | Hagstrum | A01K 15/02 | 119/713 |
| 6,735,630 B1* | 5/2004 | Gelvin | B60R 25/1004 | 706/33 |
| 6,816,086 B1* | 11/2004 | Kieffer, Sr. | G08G 1/164 | 340/436 |
| 6,826,607 B1* | 11/2004 | Gelvin | B60R 25/1004 | 709/224 |
| 6,832,251 B1* | 12/2004 | Gelvin | B60R 25/1004 | 709/224 |
| 6,832,729 B1* | 12/2004 | Perry | G06K 7/10881 | 235/462.45 |
| 6,859,831 B1* | 2/2005 | Gelvin | B60R 25/1004 | 709/224 |
| 7,020,701 B1* | 3/2006 | Gelvin | G01D 21/00 | 250/332 |
| 7,119,676 B1* | 10/2006 | Silverstrim | G01D 21/00 | 340/531 |
| 7,136,782 B1* | 11/2006 | Araki | G05B 23/0221 | 702/188 |
| 7,474,164 B2* | 1/2009 | Saito | G01S 7/03 | 331/117 R |
| 7,918,185 B2* | 4/2011 | Araki | A01K 11/008 | 119/174 |
| 8,280,345 B2* | 10/2012 | Twitchell, Jr. | G06Q 10/08 | 455/404.2 |
| 8,291,069 B1* | 10/2012 | Phillips | G06F 17/18 | 375/341 |
| 8,297,857 B2* | 10/2012 | Schippers | F16M 11/10 | 396/428 |
| 8,427,309 B2* | 4/2013 | Bullard | H04L 43/065 | 340/540 |
| 8,501,097 B1* | 8/2013 | Younis | G01N 29/022 | 422/50 |
| 8,502,729 B2* | 8/2013 | Leach, Jr. | G01S 13/0209 | 340/552 |
| 8,963,681 B2* | 2/2015 | Kady | G06F 21/81 | 340/5.54 |
| 9,176,222 B2* | 11/2015 | Siaud | G01S 13/003 | |
| 9,281,461 B2* | 3/2016 | Olsen | H01L 35/08 | |
| 9,383,134 B2* | 7/2016 | Devilbiss | F25D 23/126 | |
| 9,432,271 B2* | 8/2016 | Bullard | H04L 43/065 | |
| 9,564,054 B2* | 2/2017 | Schalk | A01M 29/18 | |
| 9,632,199 B2* | 4/2017 | Olsson | G01V 3/15 | |
| 9,647,454 B2* | 5/2017 | Afzal | G01R 15/142 | |
| 9,654,232 B2* | 5/2017 | Manku | H04B 17/00 | |
| 9,780,780 B2* | 10/2017 | Sun | G01D 5/2006 | |
| 9,869,569 B2* | 1/2018 | Tian | H04Q 9/00 | |
| 9,958,228 B2* | 5/2018 | Stewart | F41A 35/00 | |
| 10,009,667 B2* | 6/2018 | Taylor | H04Q 9/00 | |
| 2002/0145519 A1* | 10/2002 | Hykawy | G08G 1/164 | 340/567 |
| 2002/0157478 A1* | 10/2002 | Seale | G01N 3/00 | 73/789 |
| 2003/0071735 A1* | 4/2003 | Hanson | A01M 29/16 | 340/573.2 |
| 2005/0081797 A1* | 4/2005 | Laitinen | A01K 11/008 | 119/720 |
| 2005/0088299 A1* | 4/2005 | Bandy | G01N 33/0075 | 340/539.16 |
| 2005/0251339 A1* | 11/2005 | Araki | G05B 23/0229 | 702/2 |
| 2007/0044732 A1* | 3/2007 | Araki | A01K 11/008 | 119/721 |
| 2007/0125413 A1* | 6/2007 | Olsen | H01L 35/08 | 136/205 |
| 2007/0174152 A1* | 7/2007 | Bjornberg | G01C 15/00 | 705/28 |
| 2007/0286071 A1* | 12/2007 | Cormode | H04L 43/16 | 370/229 |
| 2008/0007404 A1* | 1/2008 | Albert | G01S 5/0252 | 340/552 |
| 2008/0007445 A1* | 1/2008 | Leach, Jr. | G01S 13/0209 | 342/21 |
| 2008/0189000 A1* | 8/2008 | Duong | B60T 7/22 | 701/20 |
| 2009/0212918 A1* | 8/2009 | Bandy | A01H 6/16 | 340/10.1 |
| 2010/0144383 A1* | 6/2010 | Berger | G06Q 10/06 | 455/521 |
| 2010/0308073 A1* | 12/2010 | Devilbiss | F25D 23/126 | 222/1 |
| 2011/0038114 A1* | 2/2011 | Pance | G06F 1/1616 | 361/679.4 |
| 2013/0054183 A1* | 2/2013 | Afzal | G01R 15/142 | 702/141 |
| 2013/0069804 A1* | 3/2013 | Han | G06F 3/011 | 341/20 |
| 2013/0080470 A1* | 3/2013 | Stergiou | G06F 19/3418 | 707/780 |
| 2013/0231046 A1* | 9/2013 | Pope | G06K 9/00013 | 455/41.1 |
| 2013/0257641 A1* | 10/2013 | Ronning | G01S 13/42 | 342/54 |
| 2013/0257747 A1* | 10/2013 | Rossing | G06F 3/043 | 345/173 |
| 2014/0058690 A1* | 2/2014 | Tian | G01D 21/02 | 702/62 |
| 2014/0085269 A1* | 3/2014 | Armstrong-Muntner | G02F 1/1333 | 345/179 |
| 2014/0135868 A1* | 5/2014 | Bashyam | A61F 5/566 | 607/42 |
| 2014/0162729 A1* | 6/2014 | Garden | H04B 1/3888 | 455/566 |
| 2015/0070164 A1* | 3/2015 | Schalk | A01M 29/18 | 340/539.1 |
| 2015/0093988 A1* | 4/2015 | Konanur | H04B 5/0031 | 455/41.1 |
| 2015/0204995 A1* | 7/2015 | Olsson | G01V 3/15 | 324/329 |
| 2015/0338076 A1* | 11/2015 | Garcia | F21V 23/0442 | 362/205 |
| 2015/0359457 A1* | 12/2015 | Blumenthal | A63F 13/06 | 73/172 |
| 2016/0054153 A1* | 2/2016 | Sun | G01D 5/2006 | 324/207.12 |
| 2016/0054808 A1* | 2/2016 | Cho | G06F 3/017 | 345/156 |
| 2016/0301257 A1* | 10/2016 | Parks | H02J 50/20 | |
| 2016/0313044 A1* | 10/2016 | Devilbiss | F25D 23/126 | |
| 2017/0006620 A1* | 1/2017 | Reis | H04L 43/16 | |
| 2017/0011386 A1* | 1/2017 | Mullen | G06Q 20/341 | |
| 2017/0023512 A1* | 1/2017 | Cummins | G01N 27/221 | |
| 2017/0147087 A1* | 5/2017 | Pance | G06F 1/1616 | |
| 2017/0181223 A1* | 6/2017 | Sur | H04B 5/0081 | |
| 2017/0237466 A1* | 8/2017 | Carr | H02J 7/025 | 455/41.1 |
| 2017/0357022 A1* | 12/2017 | Chubak | G01V 3/02 | |

OTHER PUBLICATIONS

Anonymous, "Spot Connect: No cell signal? No problem. Turn your smartphone into a satellite communicator with SPOT Connect." pub. by Spot LLC of United States, downloaded Jun. 17, 2015, 2 pages.

Anonymous, "How Spot Works," pub. by Aviation Safety Supplies Ltd., New Zealand, downloaded Jun. 17, 2015, 2 pages.

* cited by examiner

DATA COLLECTION NETWORK AND DATA COLLECTION DEVICE

FIELD OF THE INVENTION

The present invention relates to a data collection network, in particular to a data collection device for a data network.

BACKGROUND

Networks used for data collection are known. However in inhospitable areas such as the bush, forests, large parks, islands and large inaccessible farms data collection networks face numerous issues. These issues include the battery life of the network nodes and how users servicing the nodes communicate with the nodes.

It would be desirable to have a data collection network and data collection nodes for the network that would be usable in an inhospitable environment. It would also be desirable to have a node that had a built in communication system.

Thus there is a need for a data collection network and data collection nodes for the network that would be usable in an inhospitable environment and nodes for the network that have a built in communication system or which at least provides the public or industry with a useful choice.

SUMMARY OF THE INVENTION

In one embodiment the present invention consists in a networking device comprising:
  a processor;
  memory in communication with the processor;
  at least one network device; and
  a plurality of capacitive and/or inductive based circuits, the circuits being usable for coupling accessories to the networking device and capable of being used for user input Preferably at least one of the plurality of capacitive based circuits is coupled to an aerial.

Preferably the networking device further comprising at least one piezoelectric sensor.

Preferably the networking device further comprising at least one accelerometer.

Preferably the networking device further comprising at least one indicator.

Preferably at least one indicator is at least two indicators.

Preferably the at least two indicators are two LEDs.

Preferably the networking device further comprising at least one magnetic reed switch component.

Preferably the networking device is waterproof and all external coupling to the device is made using the plurality of capacitive and/or inductive based circuits.

Preferably the at least one network device, is a plurality of network devices.

Preferably the plurality of network devices includes an RF networking device.

Preferably the plurality of network devices includes a bluetooth device.

Preferably at least one of the plurality of capacitive and/or inductive based circuits are inductively or capacitively coupled to monitoring devices.

Preferably the monitoring devices are wildlife monitoring devices.

Preferably at least one of the plurality of capacitive and/or inductive based circuits are inductively or capacitively coupled to management devices.

Preferably the monitoring devices are wildlife management devices.

Preferably at least one of the plurality of capacitive and/or inductive based circuits are inductively or capacitively coupled to sensors.

Preferably the networking device is capable of use in an inhospitable environment

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
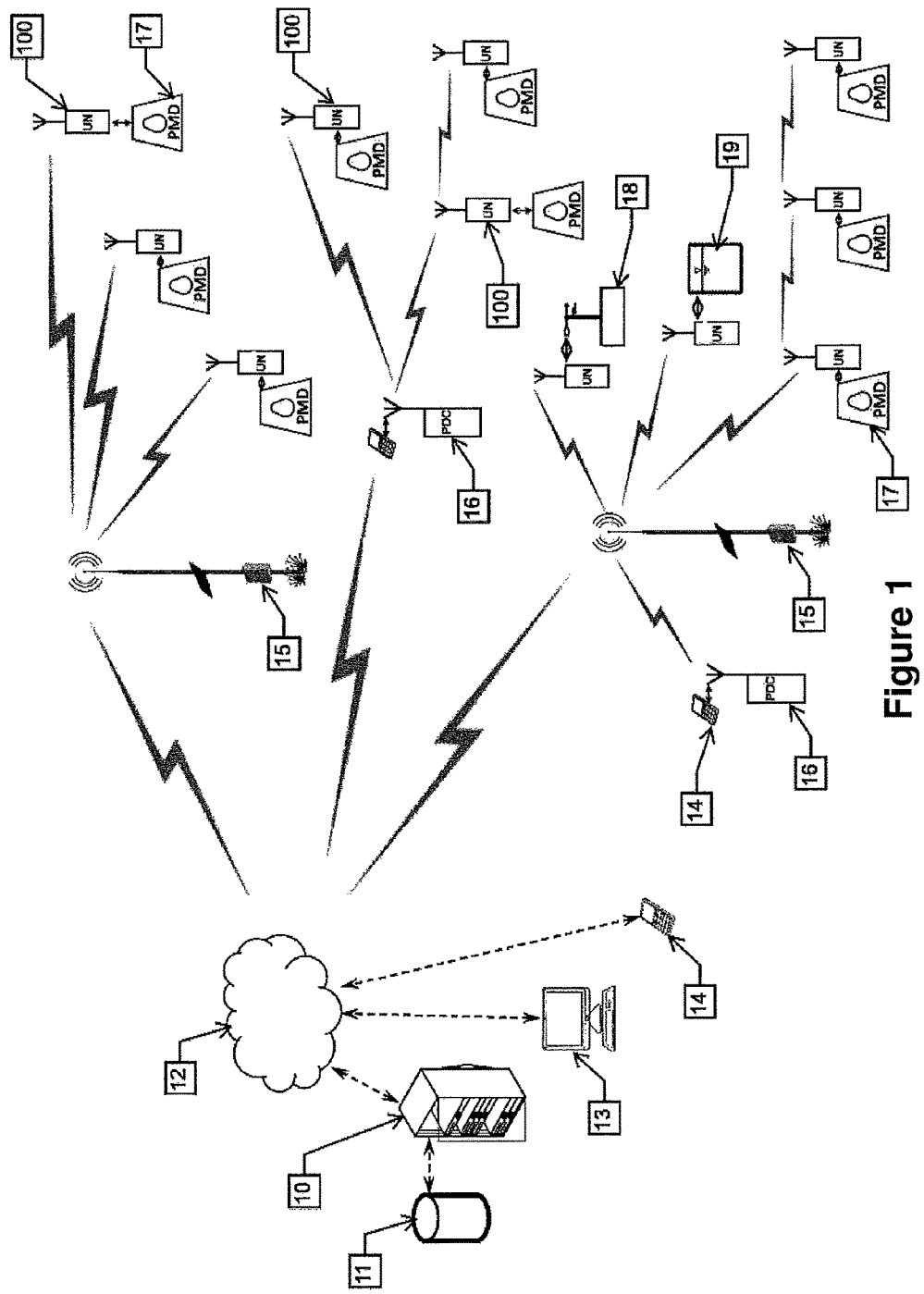
FIG. 1 is a schematic of the network system of the present invention.
Figure 2:
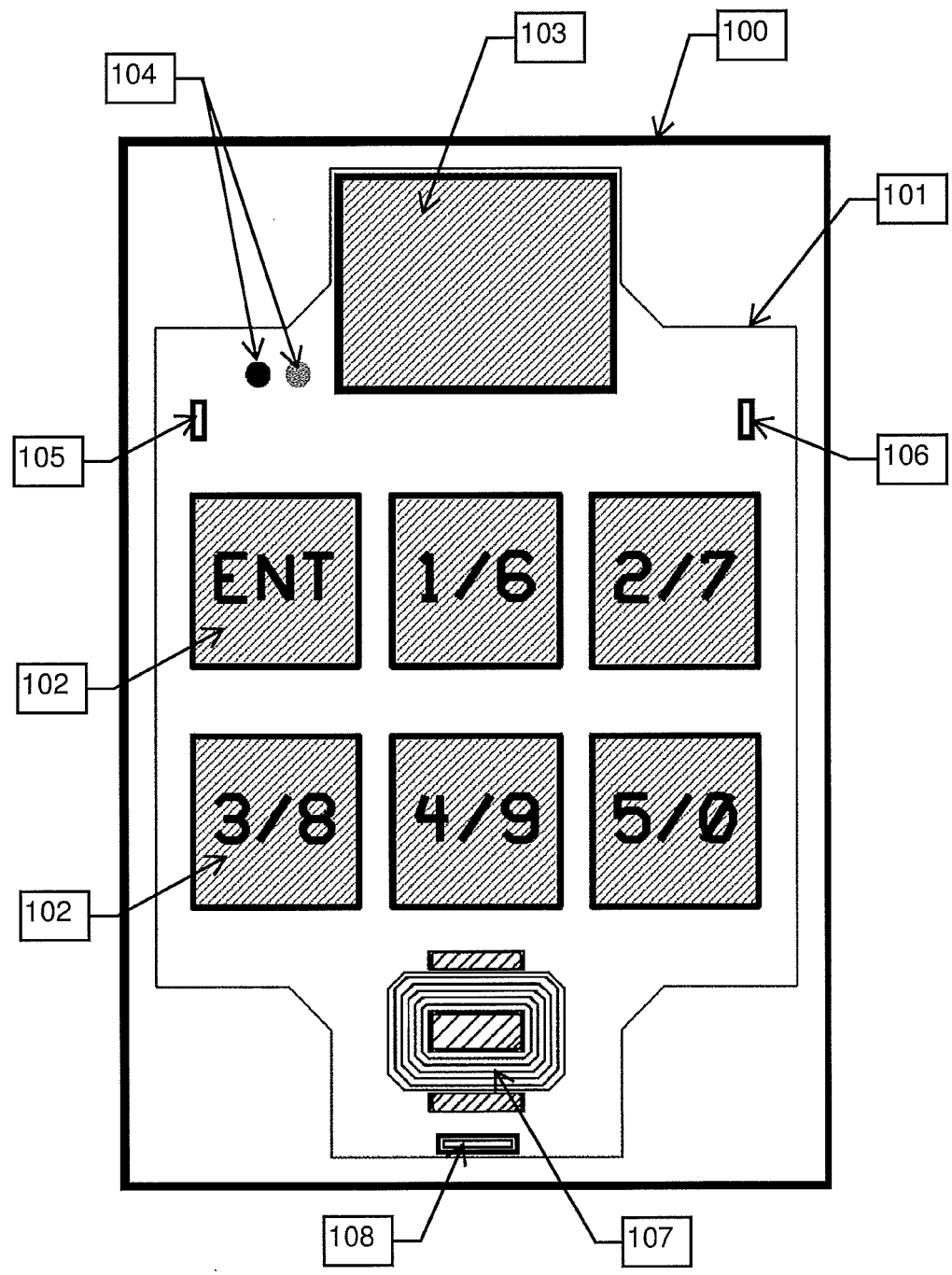
FIG. 2 is a block diagram of the universal data collection node of the present invention.
Figure 3:
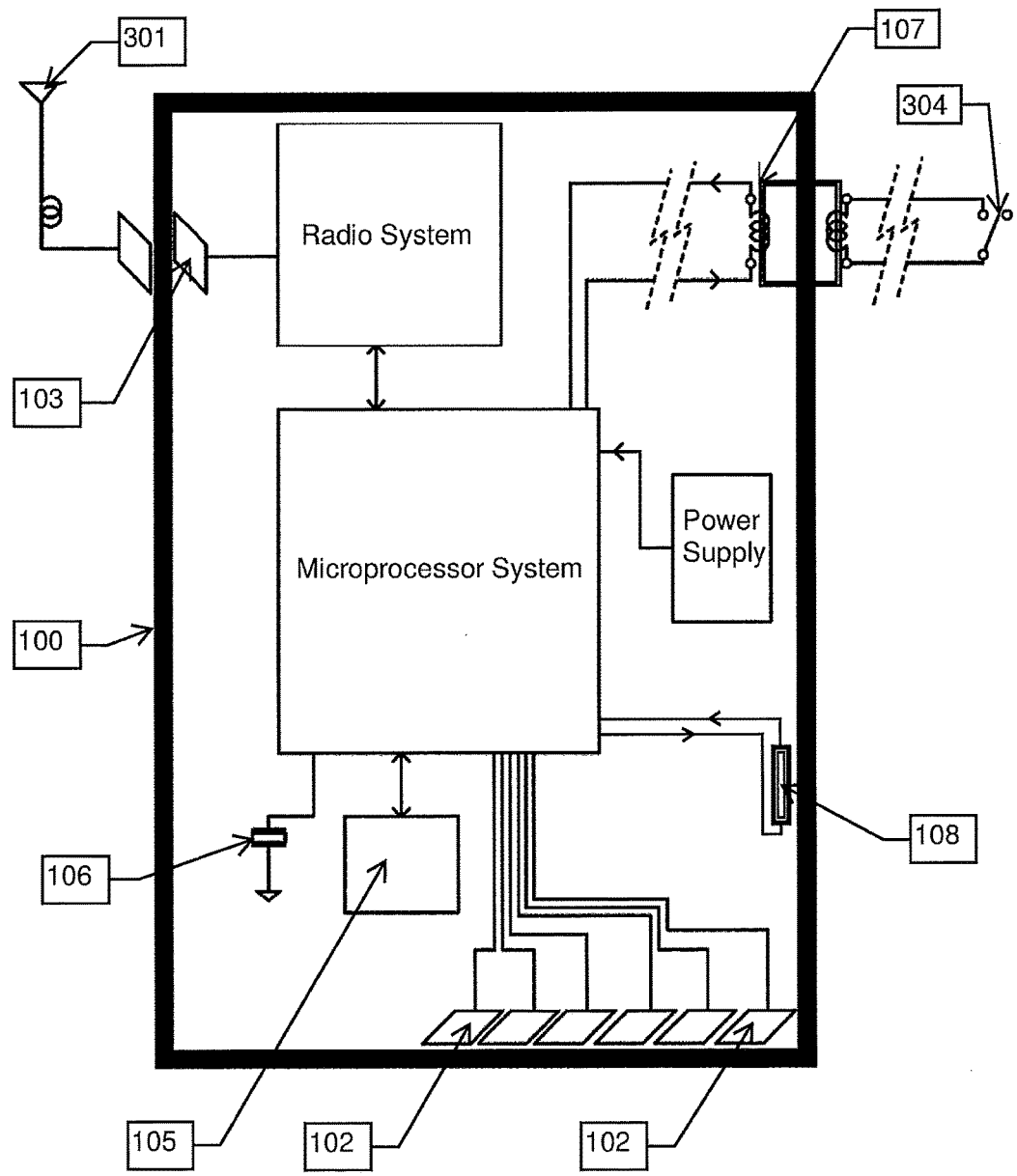
FIG. 3 is a schematic circuit diagram of the universal data collection node of the present invention.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements.

Referring to the Figures the low power wireless sensor network system 1 of the present invention will be described. The system 1 is designed for large scale deployment and is capable of operating in remote and rugged areas in addition to urban environments.

The sensor network 1 of the invention is capable of storing information using associated databases 11 connected to a system server 10 (or a plurality of servers) The system 1 provides access to the information, through standard database protocols and a web portal on the system server 10. The web portal will allow portable 14 and desktop computing devices 13 to access the data. Each user's access to the data will of course depend on the rights granted to the user. The system 1 uses a number of nodes including at least hubs 15, repeaters, universal data collection nodes 100 and portable device communicator nodes 16.

In one embodiment the universal data collection nodes 100 of the invention are used in wildlife management and monitoring 17 but the universal data collection nodes 100 may also be used to monitor and/or control other devices and systems, such as weather stations 18 asset monitoring (for example a water tank 18) and the gathering of other data including integrated land/water/biodiversity/biosecurity monitoring data.

The network system 1 of the present invention uses a radio-based network communications protocol, such as a radio frequency 'RF' based communications system, which supports multiple network topologies. The most common types of configurations are expected to be star and point-to-point with a hub and combinations of both. Any suitable network typology may be used. Communication between the system hubs and the system database controller may be via a suitable networking system such as WIFI, Ethernet, fibre ADSL, VDSL, satellite or cellular communications including 2G, 3G and 4G network protocols.

The core node in the system 1 are the universal data collection nodes 100 that incorporate interface circuits 102, 103 to connect aerials 301 and other auxiliary devices such as wildlife management devices, monitoring instrumentation, weather stations 18, storage tanks 19, battery banks, etc. Inputs from the auxiliary devices to the universal data collection nodes may be via digital, analogue, serial, mechanical or a built in user interface. The universal data collection nodes 100 allow for radio wave based wireless connections 103, connections using electrical conductors and capacitive 102 and/or inductive 107 based coupled connections as well as detection of applied magnetic fields using a reed switch 108. The coupled connections 102, 103, 107 may also be used to couple an external device such as smart phone 14 or other portable computing device with the universal data collection node 100 providing access to an input device/keypad and display.

The universal data collection nodes 100 includes at least one networking device integrated on a circuit board 101, optionally an accelerometer 105, a piezoelectric sensor 106, a magnetic reed switch 108 and indicators 104. The indicators are most likely LEDs but a busser or other audible indicator may be used. A power supply typically a battery is also incorporated on or connected to the circuit board. The circuit board 101 includes a processor and memory. Processor within this specification includes one or more processors.

The system inherently supports multiple hubs 15 (each supporting their own network of universal data collection nodes 100). Each hub 15 can support several different operating frequencies (channels) to enable a greater number of universal data collection nodes per hub.

Repeater nodes may be used in order to extend the range between universal data collection nodes and hubs, alternatively the universal data collection nodes 100 may themselves be used as repeater nodes.

The system 1 additionally supports portable device communicator nodes 16 which provide functions including serving as an intermediary between universal data collection nodes 100, hubs 15 and users. In this role portable device communicator nodes 16 can communicate with or without smart hand-held devices 14 via a wireless connection such as Bluetooth. While Bluetooth is provided as an example communication protocol other communication protocols could be used such as NFC or RFID.

The portable device communicator nodes 16 may additionally provide an emergency notification facility through system. It is envisaged that the portable device communicator nodes 16 would be used for sending and receiving data and commands to and from universal data collection nodes and hubs.

In a further embodiment portable device communicator nodes 16 can serve as a 'portable hub' for small networks where a fixed hub 15 may not be warranted. Portable device communicator nodes 16 may also be used to log signal strength and positional data for the generation of 'heat maps' and for system coverage planning.

The system 1 is designed to operation within a tightly constrained power budget and to provide redundancy so that key or critical system functions are not compromised by the failure or loss of system components or communication channels.

The data gathered by the universal data collection nodes 100 is in one embodiment sent in relatively small amounts and the data is periodically uploaded to the hubs 15 via a low-power radio link. The data from all nodes communicating with a hub 105 is aggregated and stored before being uploaded in full or in part to the system server 10.

Hubs 15 are used to optimise the data sent out of their respective networks. In the preferred embodiment not all data will necessarily be automatically uploaded to the server 10, this is to save power and costs. The amount of data upload is however configurable depending on user requirements, local data transmission costs, available power etc.

The universal data collection nodes 100 are the distributed sensors within the system 1. To take advantage of the economies of scale, the universal data collection nodes 100 provide generic functionality to enable large numbers of them to be produced.

The universal data collection nodes 100 feature button sensors 102.

The universal data collection nodes 100 further have a built in user interface using the sensors 102 to provide the ability to manually set firmware options and input data into the universal data collection nodes 100. The user interface is provided by capacitive and/or inductive sensors (buttons) and optionally at least one piezoelectric sensor 106 and one accelerometer 105.

The piezoelectric sensor 106 and accelerometer 105 in the universal data collection nodes 100 enable a user to wake/activate the capacitive user interface 102 by tapping on the universal data collection nodes 100. In an alternative embodiment the accelerometer 105 could be used to send commands to or enter data into the sensor node using a tapping sequence or vibrations with specified characteristics.

The capacitive 102 and/or inductive buttons 107 of the universal data collection nodes 100 provide a means for a user to send commands to or enter data into the universal data collection nodes 100 without requiring either a radio wave based wireless connection or a connection using an electrical conductor.

The capacitive 102 and/or inductive buttons 107 are also designed to enable circuits to be coupled to the universal data collection node 100 using capacitive and/or inductive based connections at the button locations. This enables a circuit to be connected without requiring a penetration through the node housing and allows the node to be waterproof. An example application for such circuits will be to monitor the status of wildlife management devices 17 such as live capture traps. Another example is the ability to monitor a remote switch 304 that does not need a powered circuit without needing to penetrate through the node housing. Other sensor functionality may include providing the universal data collection node 100 with the ability to detect the presence of objects, liquids, animals or products using the sensors 102, 107.

The capacitive 102 and/or inductive buttons (circuits) 107 may further provide sensor functionality such as providing the universal data collection node 100 with the ability to detect the presence and optionally characteristics of objects, liquids, animals or products.

Universal data collection nodes 100 can additionally have the ability to listen for emergency transmissions initiated from portable device communicator nodes 16 or another universal data collection nodes 100. Having received an emergency transmission the universal data collection nodes 100 switch to an emergency beacon type state to assist with locating personnel who initiated the emergency transmission. Depending on the number of nodes in a network that pick up an emergency transmission, the supervising hubs 15 can manage which universal data collection nodes 100, if any switch to an emergency beacon type state.

The portable device communicator nodes 16 of the system 1 provide a range of functions within the system 1. They are designed to provide functionality both with and without a connection to a smart hand-held device 14 communicating via wireless connection, such as Bluetooth.

Portable device communicator node 16 functions include: serving as an intermediary between various other system nodes and smart hand-held devices. In this role portable device communicator nodes 16 communicate with the smart hand-held devices via a wireless connection, such as Bluetooth.

Portable device communicator nodes 16 can server as an intermediary between system nodes 100 and hubs 15 and users without requiring a connection to a smart hand-held device 14. Portable device communicator nodes 16 may be used as a portable hub for small networks where a fixed hub may not be warranted.

In one embodiment portable device communicator nodes 16 will have a GPS receiver and one or more wireless transceivers. Portable device communicator node may also have sensors and be programmed to enable either automatic or user initiated emergency notifications/messages to be transmitted out through the system. Further portable device communicator nodes 16 can switch to an emergency beacon type state to assist with locating personnel who initiated the emergency transmission. When a portable device communicator node 16 is connected to a smart hand-held device 14 the portable device communicator node 16 can provide users with the ability to send out a short text message through the system 1.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

I claim:

1. A networking device comprising:
a processor;
memory in communication with the processor;
at least one network device;
a plurality of capacitive and/or inductive based circuits, the plurality of capacitive and/or inductive based circuits being usable for coupling accessories to the networking device at least one of the plurality of capacitive and/or inductive based circuits are inductively or capacitively coupled to wildlife monitoring or management devices; and
a user interface provided by the plurality of capacitive and/or inductive based circuits.

2. The networking device as claimed in claim 1 further comprising at least one piezoelectric sensor.

3. The networking device as claimed in claim 1 further comprising at least one accelerometer.

4. The networking device as claimed in claim 1 further comprising at least one indicator.

5. The networking device as claimed in claim 4 wherein the at least one indicator is at least two indicators.

6. The networking device as claimed in claim 5 wherein the at least two indicators are two LEDs.

7. The networking device as claimed in claim 1 further comprising at least one magnetic reed switch.

8. The networking device as claimed in claim 1 wherein the networking device is waterproof and all external couplings to the networking device are made using the plurality of capacitive and/or inductive based circuits.

9. The networking device as claimed in claim 8 wherein at least one of the plurality of capacitive based circuits is coupled outside of the networking device to an aerial.

10. The networking device as claimed in claim 1 wherein the at least one network device, is a plurality of network devices.

11. The networking device as claimed in claim 10 wherein the plurality of network devices includes an RF networking device.

12. The networking device as claimed in claim 11 wherein the plurality of network devices includes a Bluetooth device.

13. The networking device as claimed in claim 1 wherein at least one of the plurality of capacitive and/or inductive based circuits are inductively or capacitively coupled to sensors.

14. The networking device as claimed in claim 1 wherein the networking device is capable of use in an inhospitable environment.

15. A networking device comprising:
a processor;
memory in communication with the processor;
at least one network device;
a plurality of capacitive and/or inductive based circuits, the plurality of capacitive and/or inductive based circuits being usable for coupling accessories to the networking device, and
a user interface provided by the plurality of capacitive and/or inductive based circuits,
wherein the device is waterproof and all external couplings to the device are made using the plurality of capacitive and/or inductive based circuits.

16. The networking device as claimed in claim 15 wherein at least one of the plurality of capacitive and/or inductive based circuits are inductively or capacitively coupled to sensors including wildlife management or monitoring devices, and at least one of the plurality of capacitive based circuits is coupled to an aerial.

17. A networking device comprising:
a processor;
memory in communication with the processor;
at least one network device;
a plurality of capacitive and/or inductive based circuits, the plurality of capacitive and/or inductive based circuits being usable for coupling accessories to the networking device;
a user interface provided by the plurality of capacitive and/or inductive based circuits; and
at least one accelerometer wherein the accelerometer is used to send commands to or enter data into the networking device using a tapping sequence or vibrations with specified characteristics.

18. The networking device as claimed in claim 17 wherein at least one of the plurality of capacitive and/or inductive based circuits are inductively or capacitively coupled to sensors including wildlife management or monitoring devices, and at least one of the plurality of capacitive based circuits is coupled to an aerial.

19. A networking device comprising:

a processor;

memory in communication with the processor;

at least one network device;

wherein the networking device is waterproof and all external couplings to the networking device are made using the plurality of capacitive and/or inductive based circuits and wherein at least one of the plurality of capacitive based circuits is coupled outside of the networking device to an aerial.

* * * * *